(12) United States Patent
Tian et al.

(10) Patent No.: US 10,859,877 B2
(45) Date of Patent: Dec. 8, 2020

(54) DISPLAY PANEL, MANUFACTURING METHOD THEROF, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Pengcheng Tian, Beijing (CN); Bin Zhao, Beijing (CN); Xin Li, Beijing (CN); Detao Zhao, Beijing (CN); Le Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/322,273

(22) PCT Filed: Mar. 21, 2018

(86) PCT No.: PCT/CN2018/079737
§ 371 (c)(1),
(2) Date: Jan. 31, 2019

(87) PCT Pub. No.: WO2018/171610
PCT Pub. Date: Sep. 27, 2018

(65) Prior Publication Data
US 2019/0196237 A1 Jun. 27, 2019

(30) Foreign Application Priority Data

Mar. 21, 2017 (CN) .......................... 2017 1 0169527

(51) Int. Cl.
*G02F 1/1339* (2006.01)
*G02F 1/1362* (2006.01)
(Continued)

(52) U.S. Cl.
CPC ........ *G02F 1/1339* (2013.01); *G02F 1/13306* (2013.01); *G02F 1/133345* (2013.01); *G02F 1/136209* (2013.01); *G02F 2201/42* (2013.01)

(58) Field of Classification Search
CPC .. G02F 1/1339; G02F 1/1354; G02F 1/13306; G02F 1/133345; G02F 1/136236;
(Continued)

(56) References Cited

U.S. PATENT DOCUMENTS 8,885,134 B2    11/2014 Nagasawa
9,733,505 B2    8/2017 Nodera et al.
(Continued)

FOREIGN PATENT DOCUMENTS

CN    102314027 A    1/2012
CN    102854665 A    1/2013
(Continued)

OTHER PUBLICATIONS

International Search Report dated Jun. 27, 2018 issued in corresponding International Application No. PCT/CN2018/079737.
(Continued)

*Primary Examiner* — Angela K Davison
(74) *Attorney, Agent, or Firm* — Nath, Goldberg & Meyer; Joshua B. Goldberg (57) ABSTRACT

The present disclosure provides a display panel, a manufacturing method thereof and a display device. The display panel includes an opposite substrate and a display substrate opposite each other, a sealant is disposed between the opposite substrate and the display substrate, and the display substrate may be divided into a display area and a peripheral
(Continued)

area around the display area. The display substrate includes a first base substrate; a first resin pattern on the first base substrate in the display area; and a protection layer in the display area and the peripheral area and between the first resin pattern and the first base substrate. The sealant is in the peripheral area and in contact with a portion of the protection layer in the peripheral area.

5 Claims, 4 Drawing Sheets (51) Int. Cl.
*G02F 1/1333* (2006.01)
*G02F 1/133* (2006.01)

(58) Field of Classification Search
CPC ..... G02F 2001/133311; G02F 2201/50; G02F 2201/42; G02F 2201/121; G02F 2202/22; H01L 51/5246; H01L 29/78603; H01L 27/1288
See application file for complete search history.

(56) References Cited

U.S. PATENT DOCUMENTS

| | | | |
|---|---|---|---|
| 9,835,905 | B2 | 12/2017 | Yamaguchi et al. |
| 2011/0124153 | A1* | 5/2011 | Hosoba ............ H01L 21/67115 438/104 |
| 2012/0314148 | A1* | 12/2012 | Yamaguchi ......... H01L 51/5246 349/42 |
| 2018/0149896 | A1* | 5/2018 | Aburazaki .......... G02F 1/13338 |

FOREIGN PATENT DOCUMENTS

| | | |
|---|---|---|
| CN | 203365864 U | 12/2013 |
| CN | 104360532 A | 2/2015 |
| CN | 105093692 A | 11/2015 |
| CN | 105223747 A | 1/2016 |
| CN | 105247408 A | 1/2016 |
| CN | 106249487 A | 12/2016 |
| JP | 2014102514 U | 6/2014 |

OTHER PUBLICATIONS

Office Action dated Mar. 1, 2019 issued in corresponding Chinese Application No. 201710169527.0.

* cited by examiner

DISPLAY PANEL, MANUFACTURING METHOD THEROF, AND DISPLAY DEVICE

CROSS-REFERENCE TO RELATED APPLICATIONS

This is a National Phase Application filed under 35 U.S.C. 371 as a national stage of PCT/CN2018/079737, filed on Mar. 21, 2018, an application claiming the priority of Chinese Patent Application No. 201710169527.0, filed on Mar. 21, 2017, the contents of which are incorporated herein in their entirety by reference.

TECHNICAL FIELD

The present disclosure relates to the field of display technology, and in particular, relates to a display panel, a manufacturing method thereof, and a display device.

BACKGROUND

With the development of display technology, liquid crystal display devices have been used more and more widely. A liquid crystal display device may include an array substrate and a color filter substrate opposite to each other. The array substrate may be divided into a display area and a peripheral area around the display area. A gate drive circuit (e.g., Gate On Array, GOA for short) and a metal wiring connected to the gate drive circuit are formed in the peripheral area, and a protection layer is provided on the gate drive circuit and the metal wiring.

SUMMARY

The present disclosure provides a display panel, a manufacturing method thereof, and a display device.

According to an aspect of the present disclosure, there is provided a display panel, including:
an opposite substrate;
a display substrate, the display substrate and the opposite substrate being opposite to each other with a sealant disposed therebetween, the display substrate including a display area and a peripheral area around the display area, wherein the display substrate includes:
a first base substrate;
a first resin pattern on the first base substrate in the display area;
a protection layer in the display area and the peripheral area and between the first resin pattern and the first base substrate;
wherein the sealant is in the peripheral area, and the sealant is in contact with at least a part of a portion of the protection layer in the peripheral area.

According to an embodiment of the present disclosure, the sealant is in contact with the entire portion of the protection layer in the peripheral area.

According to an embodiment of the present disclosure, the display panel further includes a second resin pattern on a part of the portion of the protection layer in the peripheral area, and the protection layer is also between the second resin pattern and the first base substrate; and
the sealant is in contact with a remaining part, on which the second resin pattern is not provided, of the portion of the protection layer in the peripheral area.

According to an embodiment of the present disclosure, the first resin pattern and the second resin pattern are in a same layer.

According to an embodiment of the present disclosure, a material of the protection layer is silicon nitride.

According to an embodiment of the present disclosure, the display substrate further includes a metal pattern between the protection layer and first base substrate According to an embodiment of the present disclosure, the display panel further includes a gate drive circuit, wherein:
the gate drive circuit is in the peripheral area,
the metal pattern and the gate drive circuit are in a same layer, and
the protection layer is on the gate drive circuit.

According to an embodiment of the present disclosure, the display substrate further includes a via hole penetrating through the first resin pattern and the protection layer to reach the metal pattern and exposing a part of the metal pattern.

According to an embodiment of the present disclosure, the display substrate is an array substrate, the opposite substrate is a color filter substrate, and liquid crystal is between the array substrate and the color filter substrate.

According to an embodiment of the present disclosure, the opposite substrate includes: a second base substrate; and a black matrix and color filter blocks on a side of the second base substrate close to the first base substrate.

According to an embodiment of the present disclosure, a back electrode made of a transparent conductive material is on a side of the second base substrate distal to the first base substrate.

According to an embodiment of the present disclosure, the display panel includes a first polarizer on a side of the first base substrate distal to the second base substrate and a second polarizer on a side of the back electrode distal to the second base substrate.

According to an embodiment of the present disclosure, the display panel further includes a via hole penetrating through the protection layer and the first resin pattern to reach the metal pattern and exposing a part of the metal pattern.

According to another aspect of the present disclosure, there is provided a display device including the above display panel.

According to another aspect of the present disclosure, there is provided a method for manufacturing a display panel, including:
preparing a display substrate, wherein the display substrate is divided into a display area and a peripheral area around the display area, and the display substrate includes:
a first base substrate,
a first resin pattern on the first base substrate in the display area, and
a protection layer located in both the display area and the peripheral area and formed between the first resin pattern and the first base substrate;
preparing an opposite substrate; and
arranging the display substrate and the opposite substrate to be opposite to each other and providing a sealant between the display substrate and the opposite substrate, wherein the sealant is located in the peripheral area, and the sealant is in contact with at least a part of a portion of the protection layer in the peripheral area.

According to an embodiment of the present disclosure, preparing the display substrate further includes: forming a metal pattern between the protection layer and first base substrate, and forming a via hole penetrating through the first resin pattern and the protection layer to reach the metal pattern and exposing a part of the metal pattern.

According to an embodiment of the present disclosure, preparing the display substrate includes:

forming the protection layer on the first base substrate; and forming the first resin pattern on the protection layer.

According to an embodiment of the present disclosure, preparing the display substrate further includes: forming a gate drive circuit on the first base substrate, wherein:

the gate drive circuit is located in the peripheral area, the metal pattern and the gate drive circuit are formed in a same layer, and the protection layer is formed on the gate drive circuit.

According to an embodiment of the present disclosure, forming the first resin pattern on the protection layer includes:

forming a resin material layer on the protection layer, exposing the resin material layer using a mask plate to form an exposure pattern, the exposure pattern including a resin removed region, a resin partly remaining region, and a resin completely remaining region, wherein the resin partly remaining region includes a removable portion and a remaining portion;

developing the exposure pattern to remove the resin removed region and the removable portion of the resin partly remaining region;

etching a portion of the protection layer corresponding to the resin removed region to form the via hole; and removing the remaining portion of the resin partly remaining region to expose the portion of the protection layer in the peripheral area, and thinning the resin completely remaining region to form the first resin pattern, wherein the resin completely remaining region corresponds to the first resin pattern, and the resin partly remaining region corresponds to the portion of the protection layer in the peripheral area.

According to an embodiment of the present disclosure, the sealant is formed on the entire portion of the protection layer in the peripheral area.

According to an embodiment of the present disclosure, thinning the resin completely remaining region further includes forming a second resin pattern, wherein the second resin pattern is located in a part of the peripheral area, the resin completely remaining region further corresponds to the second resin pattern, and the resin partly remaining region corresponds to a part, on which the second resin pattern is not formed, of the portion of the protection layer in the peripheral area.

According to an embodiment of the present disclosure, the sealant is formed on the part of the portion of the protection layer in the peripheral area and on the second resin pattern.

DETAILED DESCRIPTION

In order to enable those skilled in the art to better understand technical solutions of the present disclosure, a display panel, a manufacturing method thereof and a display device provided by the present disclosure will be described in detail below with reference to the accompanying drawings.

In a manufacturing process of an array substrate, it is necessary to etch a protection layer using a mask. For this purpose, a resin layer, as a mask, may be provided on the protection layer to fully cover the display area and the peripheral area. In a process of assembling the array substrate with a color filter substrate, a sealant needs to be provided in the peripheral area. Since the resin layer is provided in the peripheral area, the sealant can only contact with the resin layer, resulting in that the peeling off of the sealant from the array substrate is likely to occur.

Figure 1:
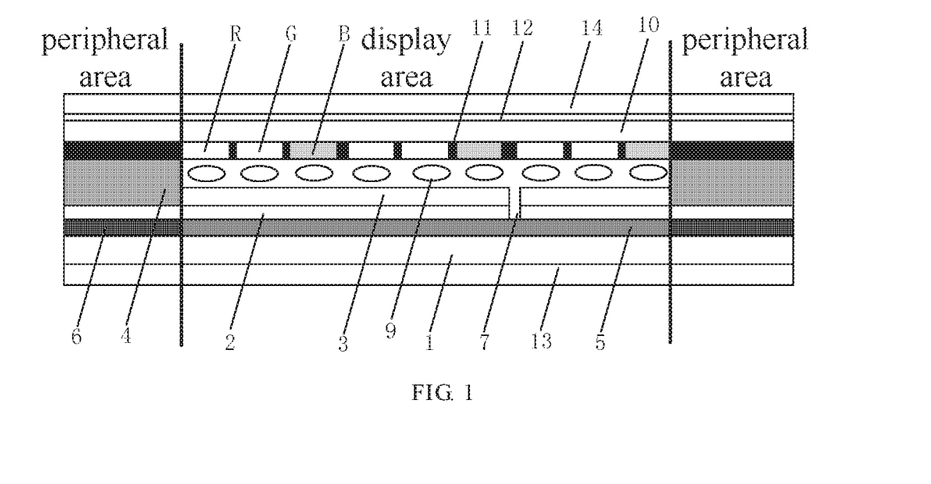
FIG. 1 is a schematic structural diagram of a display panel according to an embodiment of the present disclosure.

FIG. 1 is a schematic structural diagram of a display panel according to an embodiment of the present disclosure. As shown in FIG. 1, the display panel includes an opposite substrate and a display substrate opposite to each other, a sealant 4 is provided between the display substrate and the opposite substrate, and the display substrate may be divided into a display area and a peripheral area in the periphery of the display area. The display substrate may include a first base substrate 1, a first resin pattern 3 on the first base substrate 1 and in the display area, and a protection layer 2 in both the display area and the peripheral area and between the first resin pattern 3 and the first base substrate 1. The sealant 4 is located in the peripheral area, and the sealant 4 is in contact with a portion of the protection layer 2 in the peripheral area.

In an embodiment, the first resin pattern 3 is located on only a portion of the protection layer 2 in the display area, and is not provided in the peripheral area. No resin pattern is provided on the portion of the protection layer 2 in the peripheral area, so that the entire portion of the protection layer 2 in the peripheral area is exposed, and thus the sealant 4 is in contact with the entire portion of the protection layer 2 in the peripheral area.

In an embodiment, the display substrate further includes a metal pattern 5 and a gate drive circuit 6 on the first base substrate 1, and the protection layer 2 is located on the metal pattern 5 and the gate drive circuit 6. The metal pattern 5 is located in the display area, and the gate drive circuit 6 is located in the peripheral area. In an embodiment, the metal pattern 5 and the gate drive circuit 6 may be disposed in a same layer. In another embodiment, the display panel further includes a metal wiring (not shown) connected to the gate drive circuit 6, and the metal wiring is located in the peripheral area and between the first base substrate 1 and the protection layer 2.

In an embodiment, a via hole 7 penetrating through both the protection layer 2 and the first resin pattern 3 may be provided, and the via hole 7 reaches the metal pattern 5 and exposes a part of the metal pattern 5. In another embodiment, an electrode pattern (not shown) may be disposed on the first resin pattern 3, and a part of the electrode pattern is located in the via hole 7 and thus in contact with the exposed metal pattern 5, thereby realizing connection between the electrode pattern and the metal pattern 5. In the embodiment, the electrode pattern may be a pixel electrode, and the material of the pixel electrode may be indium tin oxide ITO.

In an embodiment, the material of the protection layer 2 may be silicon nitride SiNx. The bonding force between the sealant and the protection layer 2 made of such a material is relatively strong, so that the bonding force between the sealant and the display substrate can be enhanced.

In an embodiment, the display substrate is an array substrate, the opposite substrate is a color filter substrate, and liquid crystal 9 may be disposed between the display substrate and the opposite substrate.

In an embodiment, the opposite substrate may include: a second base substrate 10; and a black matrix 11 and color resist blocks both on a side of the second base substrate 10 close to the first base substrate 1. The black matrix 11 is located among the color resist blocks. In the embodiment, the color resist blocks may have a plurality of colors, for example, may include a red color resist block R, a green color resist block G and a blue color resist block B, which may be sequentially arranged.

In an embodiment, a back electrode 12 may be disposed on a side of the second base substrate 10 distal to the first base substrate 1, and the back electrode 12 may be made of a transparent conductive material (e.g., ITO).

In an embodiment, a first polarizer 13 may be disposed on a side of the first base substrate 1 distal to the second base substrate 10.

In an embodiment, a second polarizer 14 may be disposed on a side of the second base substrate 10 distal to the first base substrate 1. In the embodiment, the second polarizer 14 may be located on a side of the back electrode 12 distal to the second base substrate 10.

In the display panel according to the embodiments, the first resin pattern is located in the display area, and the sealant is in contact with the portion of the protection layer in the peripheral area, so that the case where the sealant is only in contact with the resin layer in the peripheral area is avoided and the bonding force between the sealant and the display substrate is enhanced, thereby greatly reducing the undesirable phenomenon of peeling off of the sealant from the display substrate.

Figure 2:
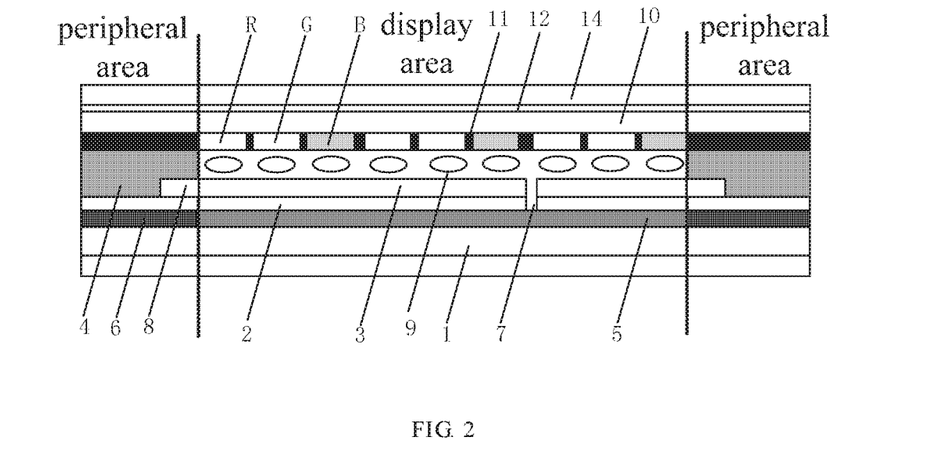
FIG. 2 is a schematic structural diagram of a display panel according to an embodiment of the present disclosure.

FIG. 2 is a schematic structural diagram of a display panel according to an embodiment of the present disclosure. As shown in FIG. 2, in the embodiment, the display substrate may further include a second resin pattern 8. The second resin pattern 8 is located on a part of the portion of the protection layer 2 in the peripheral area, and the protection layer 2 is located between the second resin pattern 8 and the first base substrate 1. The sealant 4 is in contact with the remaining part, on which the second resin pattern 8 is not disposed, of the portion of the protection layer 2 in the peripheral area.

In the embodiment, the second resin pattern 8 is disposed on a part of the portion of the protection layer 2 in the peripheral area, no resin pattern is disposed on the remaining part of the portion of the protection layer 2 in the peripheral area, the remaining part of the portion of the protection layer 2 is exposed, and therefore, the sealant 4 is in contact with the exposed remaining part of the portion of the protection layer 2 in the peripheral area.

In the embodiment, the second resin pattern 8 is located at a position, close to the display area, in the peripheral area, and is connected to the first resin pattern 3. In another embodiment, the second resin pattern 8 may also be located at other position in the peripheral area, which is not listed one by one herein.

In the embodiment, the first resin pattern 3 may be disposed in the same layer as the second resin pattern 8.

For the description of the other structures in the embodiment, reference may be made to the embodiments described with reference to FIG. 1, and details thereof are not repeatedly described herein.

In the display panel according to the embodiments, the first resin pattern is located in the display area, the second resin pattern is located at only a part of the peripheral area, and the sealant is in contact with a part, on which the second resin pattern is not disposed, of the portion of the protection layer in the peripheral area, so that the case where the sealant is only in contact with the resin layer in the peripheral area is avoided and the bonding force between the sealant and the display substrate is enhanced, thereby greatly reducing the undesirable phenomenon of peeling off of the sealant from the display substrate.

Another embodiment of the present disclosure provides a display device including a display panel.

The display panel in the embodiment may be a display panel provided in the embodiment described with reference to FIG. 1 or FIG. 2. Detailed description thereof may refer to the foregoing embodiments, and is not repeatedly given herein.

In the display device provided in the embodiment, the first resin pattern is located in the display area, and the sealant is in contact with the portion of the protection layer in the peripheral area, so that the case where the sealant is only in contact with the resin layer in the peripheral area is avoided and the bonding force between the sealant and the display substrate is enhanced, thereby greatly reducing the undesirable phenomenon of peeling off of the sealant from the display substrate.

Figure 3:
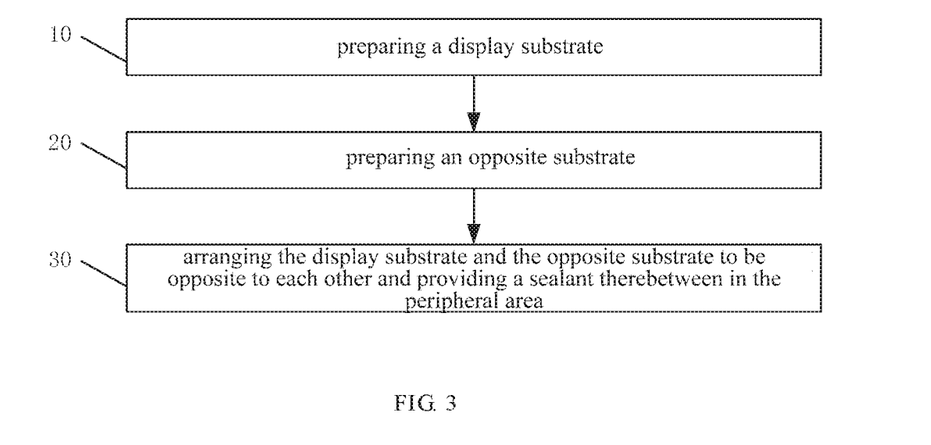
FIG. 3 is a flowchart of a method for manufacturing a display panel according to an embodiment of the present disclosure.

FIG. 3 is a flowchart of a method for manufacturing a display panel according to an embodiment of the present disclosure. As shown in FIG. 3, the method includes the steps as follows.

At step 10, a display substrate is prepared. The display substrate may be divided into a display area and a peripheral area located around the display area, and the display substrate includes a first base substrate, a protection layer, and a first resin pattern. The protection layer is located in both the display area and the peripheral area and formed between the first resin pattern and the first base substrate, and the first resin pattern is located in the display area.

In an embodiment, step 10 may further include step 101 of forming a protection layer on the first base substrate.

Figure 4A:
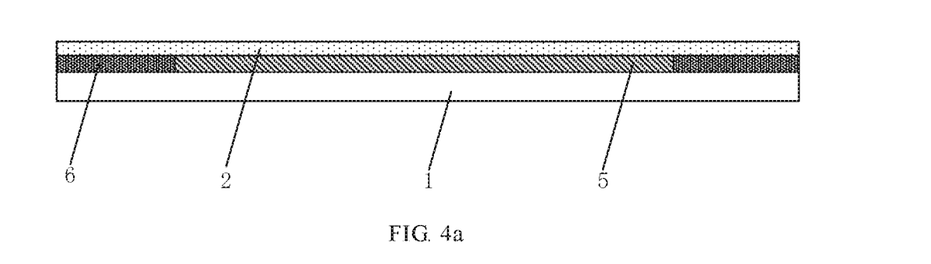
FIG. 4a is a schematic diagram of forming a protection layer according to an embodiment of the present disclosure.

FIG. 4a is a schematic diagram of forming a protection layer according to an embodiment. As shown in FIG. 4a, a protection layer 2 is formed on the first base substrate 1. In the embodiment, a metal pattern 5 and a gate drive circuit 6 are formed on the first base substrate 1, and the protection layer 2 may be formed on the metal pattern 5 and the gate drive circuit 6. In the embodiment, the metal pattern 5 is located in the display area, the gate drive circuit 6 is located in the peripheral area, and the metal pattern 5 and the gate drive circuit 6 may be formed in a same layer.

Step 10 may further include step 102 of forming a first resin pattern on the protection layer.

Step 102 may include steps 1021 to 1025.

At step 1021, a resin material layer is formed on the protection layer.

Figure 4B:
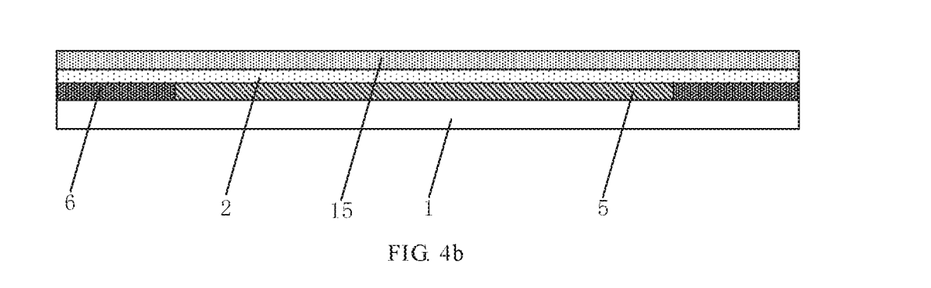
FIG. 4b is a schematic diagram of forming a resin material layer according to an embodiment of the present disclosure.

FIG. 4b is a schematic diagram of forming a resin material layer according to an embodiment. As shown in FIG. 4b, a resin material layer 15 is formed on the protection layer 2. In the present embodiment, the resin material layer 15 is formed of a photosensitive resin.

At step 1022, the resin material layer is exposed using a mask plate to form an exposure pattern, the exposure pattern includes a resin removed region, a resin partly remaining region, and a resin completely remaining region, and the resin partly remaining region includes a removable portion and a remaining portion.

Figure 4C:
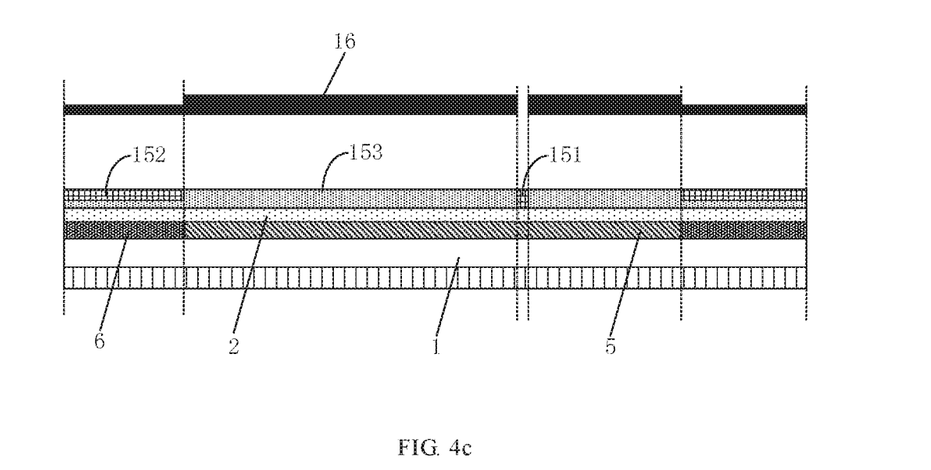
FIG. 4c is a schematic diagram of exposing a resin material layer according to an embodiment of the present disclosure.

FIG. 4c is a schematic diagram of exposing a resin material layer according to an embodiment. As shown in FIG. 4c, the resin material layer 15 is exposed using a mask plate 16 to form an exposure pattern including a resin removed region 151, a resin partly remaining region 152, and a resin completely remaining region 153. The part of the mask plate 16 corresponding to the peripheral area is a halftone mask (HTM for short), and the halftone mask is used to form the resin partly remaining region 152, and the remaining parts of the mask plate 16 are used to form the resin removed region 151 and the resin completely remaining region 153.

At step 1023, the exposure pattern is developed to remove the resin removed region and the removable portion of the resin partly remaining region.

Figure 4D:
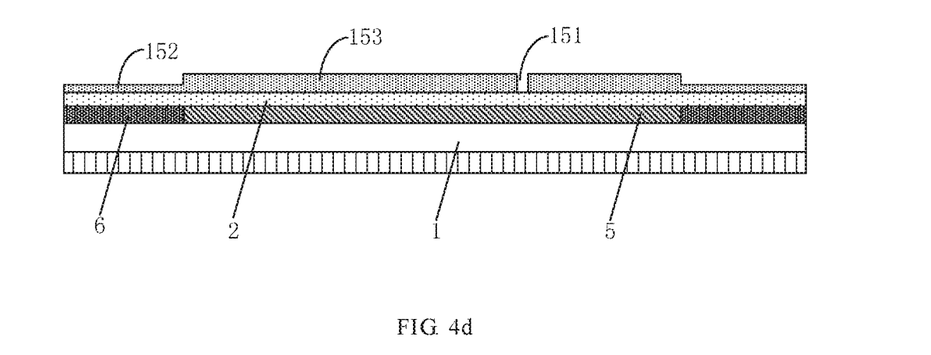
FIG. 4d is a schematic diagram of developing an exposure pattern according to an embodiment of the present disclosure.

FIG. 4d is a schematic diagram of developing an exposure pattern according to an embodiment. As shown in FIG. 4d, the exposure pattern is developed to remove the resin removed region 151 and the removable portion of the resin partly remaining region 152 that are exposed, and maintain the unexposed resin completely remaining region 153 and the unexposed portion (i.e., the remaining portion) of the resin partly remaining region 152.

At step 1024, a portion of the protection layer corresponding to the resin removed region that has been fully exposed is etched to form a via hole.

Figure 4E:
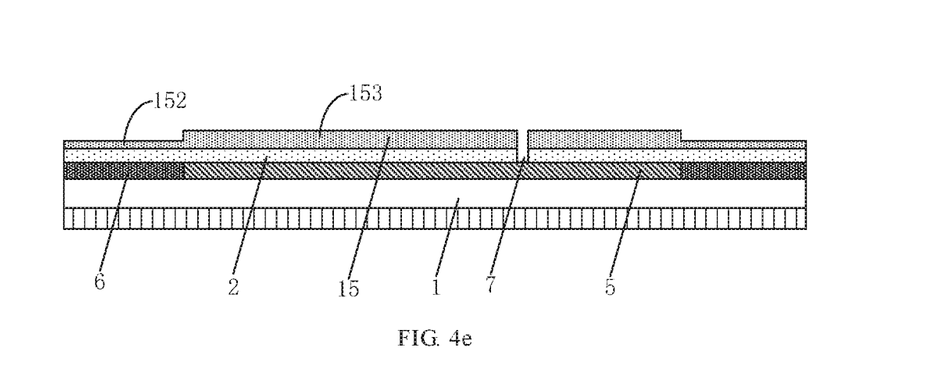
FIG. 4e is a schematic diagram of forming a via hole according to an embodiment of the present disclosure.

FIG. 4e is a schematic diagram of forming a via hole according to an embodiment. As shown in FIG. 4e, a portion of the protection layer 2 corresponding to the resin removed region 151 is etched to form a via hole 7. The remaining portion of the resin partly remaining region 152 in the peripheral area can ensure that a portion of the protection layer 2 located therebelow in the peripheral area is not etched off. The resin removed region 151 corresponds to the via hole 7.

At step 1025, the remaining portion of the resin partly remaining region is removed by an ashing process to expose the portion of the protection layer located in the peripheral area, and the resin completely remaining region is thinned to form a first resin pattern.

Figure 4F:
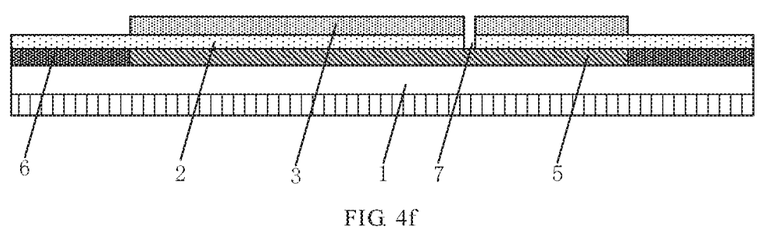
FIG. 4f is a schematic diagram of forming a first resin pattern according to an embodiment of the present disclosure.

FIG. 4f is a schematic diagram of forming a first resin pattern according to an embodiment. As shown in FIG. 4f, an ashing process is performed such that the remaining portion of the resin partly remaining region 152 is removed to expose the portion of the protection layer 2 in the peripheral area and the resin completely remaining region 153 is thinned to form the first resin pattern 3. The resin completely remaining region 153 corresponds to the first resin pattern 3, and the resin partly remaining region 152 corresponds to the portion of the protection layer 2 in the peripheral area.

In this step, the remaining portion of the resin partly remaining region 152 and the resin completely remaining region 153 are thinned together by the ashing process, so that the remaining portion of the resin partly remaining region 152 is completely removed, and the resin completely remaining region 153 is thinned to form the first resin pattern 3.

In the method for manufacturing a display panel according to an embodiment of the present disclosure, the second resin pattern 8 may be formed by thinning the resin completely remaining region, the second resin pattern is located in a part of the peripheral area, the resin completely remaining region also corresponds to the second resin pattern, and the resin partly remaining region corresponds to a part, on which the second resin pattern is not formed, of the portion of the protection layer in the peripheral area.

In an embodiment, after step 102, the method may further include forming an electrode pattern (not shown) on the first resin pattern 3. A part of the electrode pattern is located in the via hole 7 and in contact with the exposed metal pattern 5, thereby achieving connection of the electrode pattern with the metal pattern 5.

The method for manufacturing the display panel according to the embodiment further includes step 20 of preparing an opposite substrate.

The method for manufacturing the display panel according to the embodiment further includes step 30 of arranging the display substrate and the opposite substrate to be opposite to each other and providing a sealant between the display substrate and the opposite substrate, and the sealant is provided in the peripheral area and in contact with the portion of the protection layer in the peripheral area.

In an embodiment, the sealant is formed on the entire portion of the protection layer in the peripheral area to contact with the entire portion of the protection layer in the peripheral area.

In another embodiment, the sealant is formed on the part, on which the second resin pattern is not formed, of the portion of the protection layer in the peripheral area and on the second resin pattern.

The method for manufacturing the display panel provided in this embodiment can be used to manufacture the display panel provided in the embodiments described with reference to FIG. 1. Detailed description of the display panel may refer to the embodiments described with reference to FIG. 1, and is not repeatedly given herein.

The method for manufacturing the display panel provided in this embodiment can also be used to manufacture the display panel provided in the embodiments described with reference to FIG. 2, and in this case, to manufacture the display panel in the embodiment shown in FIG. 2, it only needs to change the structure of the mask plate according to the structure of the product.

In the method for manufacturing the display panel provided by the embodiments, the first resin pattern is located in the display area, and the sealant is in contact with the portion of the protection layer in the peripheral area, so that the case where the sealant is only in contact with the resin layer in the peripheral area is avoided and the bonding force between the sealant and the display substrate is enhanced, thereby greatly reducing the undesirable phenomenon of peeling off of the sealant from the display substrate. The technical solutions according to the embodiments do not require significant modification to the structure and process of the existing display substrate, and no additional manufacturing equipment and process are required, thereby reducing manufacturing costs.

It should be understood that the above embodiments are only exemplary embodiments for the purpose of explaining the principle of the present disclosure, but the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A method for manufacturing a display panel, comprising:
    preparing a display substrate, wherein the display substrate is divided into a display area and a peripheral area located around the display area, and the display substrate comprises:
        a first base substrate,
        a metal pattern formed on the first base substrate,
        a protection layer located in both the display area and the peripheral area and formed on a side of the metal pattern facing away from the first base substrate;
        a first resin pattern in the display area and formed on a side of the protection layer facing away from the first base substrate; and
        a via hole penetrating through the first resin pattern and the protection layer to reach the metal pattern and exposing a part of the metal pattern,
    preparing an opposite substrate; and
    arranging the display substrate and the opposite substrate to be opposite to each other and providing a sealant between the display substrate and the opposite substrate, wherein the sealant is located in the peripheral area, and the sealant is in contact with at least a part of a portion of the protection layer in the peripheral area,
    forming the first resin pattern comprises:
        forming a resin material layer on the protection layer;
        exposing the resin material layer using a mask plate to form an exposure pattern, the exposure pattern comprising a resin removed region, a resin partly remaining region, and a resin completely remaining region, wherein the resin partly remaining region comprises a removable portion and a remaining portion;
        developing the exposure pattern to remove the resin removed region and the removable portion of the resin partly remaining region;
        etching a portion of the protection layer corresponding to the resin removed region to form the via hole; and
        removing the remaining portion of the resin partly remaining region to expose the portion of the protection layer in the peripheral area, and thinning the resin completely remaining region to form the first resin pattern, wherein the resin completely remaining region corresponds to the first resin pattern, and the resin partly remaining region corresponds to the portion of the protection layer in the peripheral area.

2. The method of claim 1, wherein preparing the display substrate further comprises: forming a gate drive circuit on the first base substrate, wherein:
    the gate drive circuit is located in the peripheral area, and the metal pattern and the gate drive circuit are formed in a same layer; and
    the protection layer is formed on the gate drive circuit.

3. The method of claim 1, wherein the sealant is formed on the entire portion of the protection layer in the peripheral area.

4. The method of claim 1, wherein thinning the resin completely remaining region further comprises forming a second resin pattern, wherein the second resin pattern is located in a part of the peripheral area, the resin completely remaining region further corresponds to the second resin pattern, and the resin partly remaining region corresponds to a part, on which the second resin pattern is not formed, of the portion of the protection layer in the peripheral area.

5. The method of claim 4, wherein the sealant is formed on the part of the portion of the protection layer in the peripheral area and on the second resin pattern.

* * * * *